United States Patent
Baldemair et al.

(10) Patent No.: US 8,155,251 B2
(45) Date of Patent: Apr. 10, 2012

(54) DETECTION OF ACCESS BURSTS IN A RANDOM ACCESS CHANNEL

(75) Inventors: Robert Baldemair, Solna (SE); Henrik Sahlin, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 172 days.

(21) Appl. No.: 12/439,401

(22) PCT Filed: Dec. 22, 2006

(86) PCT No.: PCT/EP2006/012507
§ 371 (c)(1),
(2), (4) Date: May 26, 2009

(87) PCT Pub. No.: WO2008/025373
PCT Pub. Date: Mar. 6, 2008

(65) Prior Publication Data
US 2010/0002573 A1    Jan. 7, 2010

(30) Foreign Application Priority Data
Aug. 29, 2006    (SE) ...................................... 0601777

(51) Int. Cl.
*H03D 1/00* (2006.01)
(52) U.S. Cl. ........ 375/343; 375/340; 375/368; 370/503; 370/509; 370/514

(58) Field of Classification Search .................. None
See application file for complete search history.

(56) References Cited

U.S. PATENT DOCUMENTS

| | | | | |
|---|---|---|---|---|
| 6,282,232 B1* | 8/2001 | Fleming et al. | ............... | 375/147 |
| 6,633,559 B1 | 10/2003 | Asokan et al. | | |
| 2001/0017881 A1* | 8/2001 | Bhatoolaul et al. | ......... | 375/130 |
| 2004/0042388 A1* | 3/2004 | Yotsumoto et al. | ........... | 370/208 |
| 2005/0281316 A1* | 12/2005 | Jang et al. | ..................... | 375/130 |
| 2006/0056375 A1* | 3/2006 | Koyama et al. | ............... | 370/342 |

FOREIGN PATENT DOCUMENTS

| | | |
|---|---|---|
| EP | 1037481 A1 | 9/2000 |
| EP | 1109326 A1 | 6/2001 |
| EP | 1592192 A2 | 11/2005 |

* cited by examiner

*Primary Examiner* — Jason Mattis
*Assistant Examiner* — James P Duffy
(74) *Attorney, Agent, or Firm* — Coats & Bennett, P.L.L.C.

(57) ABSTRACT

A technique for detecting one or more access bursts (112) in a random access channel (110) is described. Each access burst includes a transmission preamble, the transmission preamble being a member of a preamble set including sequences of preamble symbols that can be obtained by cyclically shifting a basic preamble sequence. A detector (118, 120) in a radio base station (108) determines correlation information indicative of a correlation of a single correlation preamble with each of the one or more received transmission preambles, wherein the correlation preamble is a member of the preamble set. The one or more access bursts are detected based on the correlation information.

16 Claims, 8 Drawing Sheets

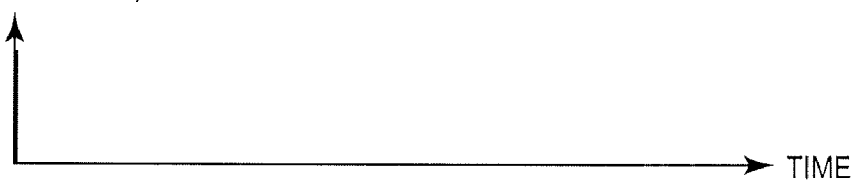
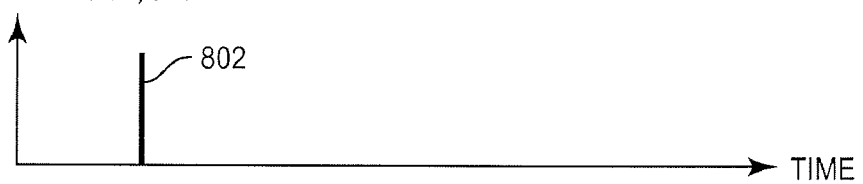
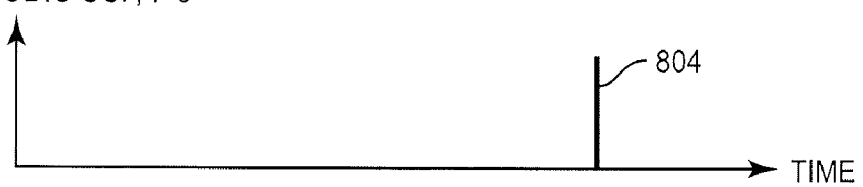
FIG. 8

DETECTION OF ACCESS BURSTS IN A RANDOM ACCESS CHANNEL

FIELD OF THE INVENTION

The invention generally relates to random access procedures performed in cellular radio networks. More specifically, the invention relates to a technique for detecting one or more access bursts in a random access channel.

BACKGROUND OF THE INVENTION

Today, not only mobile telephones but also other mobile devices such as PDAs (Personal Digital Assistants), notebooks, etc., exchange data with wireless networks via radio interfaces. Typically, a radio base station of a network, e.g. a mobile network, serves the mobile device by routing data received from the device through the network towards the recipient, and by transmitting data received from the network side over the radio interface towards the mobile device.

The transmission resources available over the radio interface, such as frequency (bandwidth), time (timeslots available in transmission frames) and transmission power, are generally limited and therefore have to be used as efficiently as possible. In this respect, the base station controls not only the resource parameters for downlink transmissions (from the base station to the device), but also for the uplink transmissions (from the device to the base station). For the uplink, the base station has to ensure that the mobile device is synchronized with the transmission scheme of the radio interface with appropriate accuracy to avoid waste of resources. To this end the base station analyzes received uplink signals, derives appropriate adjustment values for the uplink transmission parameters used by the device and sends information indicating the necessary adjustments towards the mobile device, which then has to adjust its transmission parameters accordingly.

As an example, the radio base station determines timing misalignments between the mobile device and the radio base station. Timing misalignments are caused by the variable propagation round trip delay resulting from a changing distance between mobile device and base station as well as from the mutual drift between the clocks in the base station and the device.

Whereas the synchronization of the mobile device may be performed in a straight-forward manner in case of an established uplink connection, during which signals from the device are continuously received and analyzed at the base station, no such analysis is possible in case the device wants to connect for the first time (for example at power-up or during a handover) or from a standby status (in which the device only listens to the downlink). In these circumstances a random access procedure has to be performed to achieve synchronization.

In networks such as mobile GSM or UMTS networks, a physical random access channel (RACH) is provided by the base station (also called Node-B in UMTS) over the radio interface which allows a mobile device to perform a random access procedure. During this procedure, the mobile device transmits a specific access burst (as opposed to normal transmission bursts) in the RACH. In case of a successful detection and analysis of the access burst, the base station responds by transmitting proper adjustment parameters to the mobile device.

When transmitting the access burst, the uplink transmission parameters such as time, frequency and power are in general not accurately aligned with the transmission scheme supported by the radio base station. Therefore additional resources have to be provided to the random access channel to allow for misalignments and avoid interference of the random access bursts with well synchronized normal bursts transmitted, for example, in neighbouring time slots. These extra resources comprise, for example, guard periods and guard bands in the time and frequency dimension, respectively.

In GSM networks, a particular RACH time slot is defined in the time domain. For example, time slot or sub-frame 0 in each radio frame may be reserved for the RACH. In this way, the RACH is orthogonal to other data channels, e.g. traffic channels. Within a RACH, collisions may occur as multiple mobile devices may simultaneously request access. In GSM, at most one of the simultaneously received access bursts can be successfully detected, the other bursts therefore remain unanswered by the base station. A contention resolution scheme may thus include a random back off procedure, wherein the mobile devices repeat their access requests after a randomly determined time period in case of no response from the base station.

An access burst may contain a "preamble" or "signature" sequence, which is basically a sequence of symbols. Each of the symbols in turn may comprise a sequence of bits, e.g. 4 bits. Different preambles may be provided to the mobile devices to allow simultaneous access requests of multiple devices in the same cell. An access requesting device is expected to choose (e.g., randomly) one of the predetermined preambles. The detection of access bursts in the base station thus relies on searching for the occurrence of any one of the predetermined specific preamble sequences in the RACH. A specific preamble detector may be provided in the base station which comprises a number of digital filters, one filter for each of the allowed preamble sequences. In case a signal received in the RACH matches with one of the filters to at least a predetermined accuracy, an access burst can successfully be detected.

As an example, six different preambles may be used for the access procedure. In this case, six filters have to be provided in the preamble detector. Any signal received in a random access channel has to be analyzed by all six filters in parallel in order to determine if none, one or more access bursts have been transmitted. It is clear already from this simple example that the detector requires a highly complex circuitry including a plurality of digital filters operating in parallel in order to analyze the received signal. Generally, with an increasing number of admissible preamble sequences to detect, the number of filters to be provided and thus the computational complexity increases further.

The upcoming successor of the current UMTS standard called LTE (Long Term Evolution) will utilize OFDMA (Orthogonal Frequency Division Multiple Access) as an orthogonal transmission scheme. Also in this system, there will be mutual interference between access bursts simultaneously transmitted by different mobile devices. At the same time, presumably the number of simultaneous access attempts to be processed in parallel will increase and thus the computational complexity of the detector.

In non-orthogonal systems such as W-CDMA, the RACH is shared with other uplink channels. Here, the preamble detector has to cope with mutual interference not only between multiple access bursts, but also between access bursts and other bursts, e.g., normal bursts. Also in this scenario, a detection of access bursts with an appropriate confidence level requires a very complex detector.

There is thus a need for an efficient technique for detecting one or more access bursts in a random access channel which also allows construction of detectors with limited complexity.

SUMMARY OF THE INVENTION

According to a first aspect of the invention, a method for detecting one or more access bursts in a random access channel is proposed, wherein each access burst includes a transmission preamble, the transmission preamble being a member of a preamble set including sequences of preamble symbols that can be obtained by cyclically shifting a basic preamble sequence. The method comprises the steps of receiving, in the random access channel, the one or more access bursts each including its transmission preamble; determining correlation information indicative of a correlation of a single correlation preamble with each of the one or more received transmission preambles, wherein the correlation preamble is a member of the preamble set; and detecting, based on the correlation information, the one or more access bursts.

The random access channel may be orthogonal or non-orthogonal to other channels provided over a radio interface. The preamble set may comprise, for example, 2, 4, 8, 16, 32 or 64 preamble members. A preamble sequence may comprise a plurality of symbols, for example 449 or 863 symbols. The cyclic shift may comprise one or more of the preamble symbols. For example, the preambles of a preamble set may be obtained or generated by cyclically shifting a basic preamble by one or two symbols or by the floor function of the preamble sequence length divided by the number of preambles in the preamble set. The correlation preamble may be any preamble of the preamble set. For example, the correlation preamble may be the basic preamble used for generating the preamble set.

For determining the correlation information, the correlation preamble and the one or more transmission preambles may be treated as periodic signals. Assuming that a transmission preamble contained in a received signal is periodically continued (which may or may not include a cyclic prefix) and ignoring other parts of a received access burst and other access bursts, signals corresponding to the correlation preamble and the transmission preamble may be matched over one fundamental period by shifting them against each other in the time dimension.

In one mode of the invention, the step of determining the correlation information may comprise cyclically correlating the correlation preamble and the one or more transmission preambles. Such a correlation may be performed in a frequency domain. In an implementation of this mode of the invention, the cyclic correlation is performed using Fourier Transform techniques.

In a variant of the invention, the method further comprises the step of determining, based on the correlation information, a propagation round trip time for at least one of the one or more received transmission preambles. The round trip time may then be used to provide timing advance values for a proper time alignment to the mobile devices from which the access bursts originate.

The sequences of the preamble set may be cyclically shifted versions of each other, which are shifted by at least a minimum shift which corresponds to a predetermined maximum time delay for the transmission preambles. The time delay depends on channel propagation properties. For example, the time delay may comprise a maximum propagation round trip time delay depending on cell size as well as channel impacts such as a delay spread due to multipath propagation. For example, a minimum shift may amount to one or more preamble symbols.

In one implementation of the invention, each of the preamble symbols utilized for the preamble sequences is utilized only once per preamble sequence. In this way, the preamble sequences may comprise essentially ideal periodic autocorrelation properties, i.e. the autocorrelation function is essentially a Dirac function and spurious correlation signals anywhere else are minimized. A preamble set based on such an ideal autocorrelation function may lead to clear correlation indications when correlating the correlation preamble and the one or more transmission preambles, such that a detection of access bursts can be performed with high confidence.

The correlation information may comprise a correlation function indicating the correlation of the correlation preamble and the one or more transmission preambles in a time dimension. In one mode of the invention, the step of determining the correlation information may further comprise subdividing the correlation function into zones, wherein each zone is associated with the correlation of one member of the preamble set with the correlation preamble. In a variant of this mode, the step of determining the correlation information further comprises the steps of determining a correlation peak in the correlation function corresponding to one of the one or more transmission preambles; determining the zone within which the correlation peak is located; and detecting one of the one or more received access bursts based on the determined zone. This sequence of steps may be performed multiple times, i.e. corresponding to the number of correlation peaks in the correlation function which can be successfully determined. For example, in case the correlation function comprises three detectable correlation peaks, the sequence of steps may be performed three times, leading to the detection of three access bursts corresponding to the correlation peaks.

Each of the zones corresponds to a particular time shift required to match the correlation preamble and the transmission preamble. For example, a preamble sequence set may contain six preambles, such that the correlation function may have six zones. In case all six transmission preambles are received in a RACH, there would be a correlation peak in each zone. In other words, in case several access bursts are received in the random access channel, several correlation peaks may be detected which are located in different zones as long as the originating mobile devices have utilized different preamble sequences of the preamble set.

The method may further comprise the steps of determining a peak shift of the correlation peak relative to a border of the zone within which the correlation peak is located; and calculating, based on the peak shift, the propagation round trip time. For example, a peak located near to a border of the zone indicates that the originating mobile device is near to the base station or near to the cell border.

In one mode of the invention the method comprises the steps of performing a Fourier Transform of a received signal; and extracting a frequency band corresponding to the random access channel. Other frequency bands may be extracted which correspond to different channels, e.g. signalling or traffic channels.

According to another aspect of the invention, a computer program product comprising program code portions for performing the steps of any one of the method aspects described herein when the computer program product is executed on one or more computing devices, for example a detector in a radio base station such as a Node-B in an UMTS or LTE network. The computer program product may be stored on a computer readable recording medium, such as a permanent or re-writeable memory within or associated with a computing device or a removable CD-ROM or DVD. Additionally or alternatively, the computer program product may be provided for download to a computing device, for example via a network such as the Internet or a communication line such as a telephone line.

According to a further aspect of the invention, a detector for detecting one or more access bursts in a random access channel is proposed, wherein each access burst includes a transmission preamble, the transmission preamble being a member of a preamble set including sequences of preamble symbols that can be obtained by cyclically shifting a basic preamble sequence. The detector comprises a reception component adapted to receive, in the random access channel, the one or more access bursts each including its transmission preamble; a correlation component adapted to determine correlation information indicative of a correlation of a single correlation preamble with each of the one or more received transmission preambles, wherein the correlation preamble is any member of the preamble set; and a detection component adapted to detect, based on the correlation information, the one or more access bursts. The correlation component in the detector may be adapted to treat the correlation preamble and the one or more transmission preambles as periodic signals.

According to a still further aspect, a radio base station adapted for performing a random access procedure is proposed, which comprises a detector according to the above-described aspect of the invention. In one variant of the invention, the radio base station comprises two or more detectors, wherein the detectors are configured for different preamble sets.

BRIEF DESCRIPTION OF THE DRAWINGS

In the following, the invention will further be described with reference to exemplary embodiments illustrated in the drawings, in which:

FIG. 8 is a schematic illustration of preamble sequence cross-correlations of a preamble set.

DETAILED DESCRIPTION OF THE PREFERRED EMBODIMENTS

In the following description, for purposes of explanation and not limitation, specific details are set forth, such as specific transmission schemes, particular communication nodes and devices, etc., in order to provide a thorough understanding of the current invention. It will be apparent to one skilled in the art that the current invention may be practised in other embodiments that depart from these specific details. For example, the skilled artisan will appreciate that the current invention may be practised with non-orthogonal transmission schemes instead of the examples discussed below, which are based on an orthogonal transmission scheme. The invention may be practised in any wireless network in which a random access procedure is performed. This may include also wireless local area networks, for example HIPERLAN networks, as opposed to cellular telecommunication systems or telecommunication radio networks.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to a processor, wherein the memory is encoded with one or more programs that perform the methods disclosed herein when executed by the processor.

Figure 1:
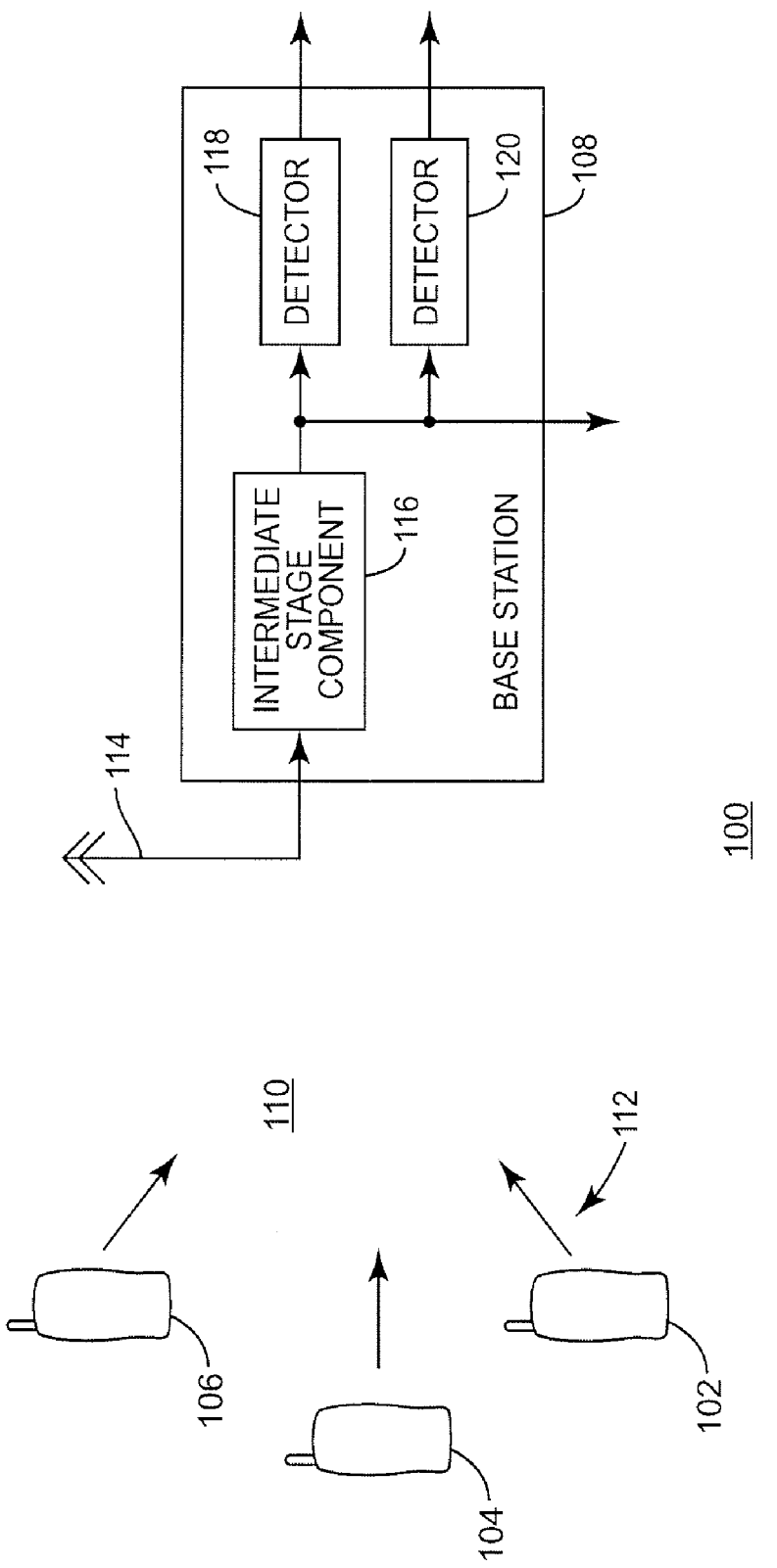
FIG. 1 is a schematic illustration of an embodiment of a communication system.

FIG. 1 schematically illustrates an embodiment of a communication system 100 including multiple mobile devices 102, 104, 106 and a radio base station 108. The mobile devices and the base station may exchange data with each other via a radio interface 110. The radio base station 108 may belong to a mobile network (not shown), for example to an UMTS LTE network. The radio base station 108 may thus also be referred to as a Node-B.

In order to establish a voice or data call, for example the mobile device 102 has to get access to the base station 108. A random access procedure has to be performed for synchronizing the device 102 with the transmission scheme provided by the base station 108 for the radio interface 110. The random access procedure includes the transmission of an access burst schematically indicated in FIG. 1 by arrow 112. The access burst is received at the radio base station 108 as a part of a radio signal via the antenna 114. The radio signal may also comprise transmission bursts from the other mobile devices 104, 106 and further mobile devices (not shown) in and around the network cell served by the base station 108. For example, one or both of the devices 104, 106 may as well transmit an access burst in the RACH of the radio interface 110.

An intermediate stage component 116 distributes the received radio signal to various further components of the base station 108 and may possibly provide further functions such as (pre-) filtering of the radio signal. In particular, the signal may be distributed to a detector 118 which is specifically adapted to detect one or more access bursts in the random access channel provided over the radio interface 110. The detector 118 may provide its detection results to further components (not shown) of the base station 108 to trigger a response to the one or more of the mobile devices 102-106 from which the one or more detected access bursts originate.

The detector 118 is adapted to simultaneously detect multiple access bursts in a RACH, as will be described in more detail below. In particular, the detector 118 may utilize a correlation preamble of a particular preamble set, the preambles of which may be included by the mobile devices 102-106 in the transmitted access bursts.

More than one preamble set may be provided for the radio interface 110. In the example illustrated in FIG. 1, the mobile devices 102-106 may utilize a preamble of a second preamble set. The specific preamble used for a random access procedure may be selected randomly by a mobile device. Alternatively, a particular preamble to be used for access requests may be implemented, e.g., at the time of manufacture of the device. The base station 108 may include a second detector 120 adapted to detect access bursts utilizing preambles of the second preamble set. The complete RACH radio signal received by the antenna 114 may be distributed to both the first and the second detectors 118 and 120.

Figure 2:
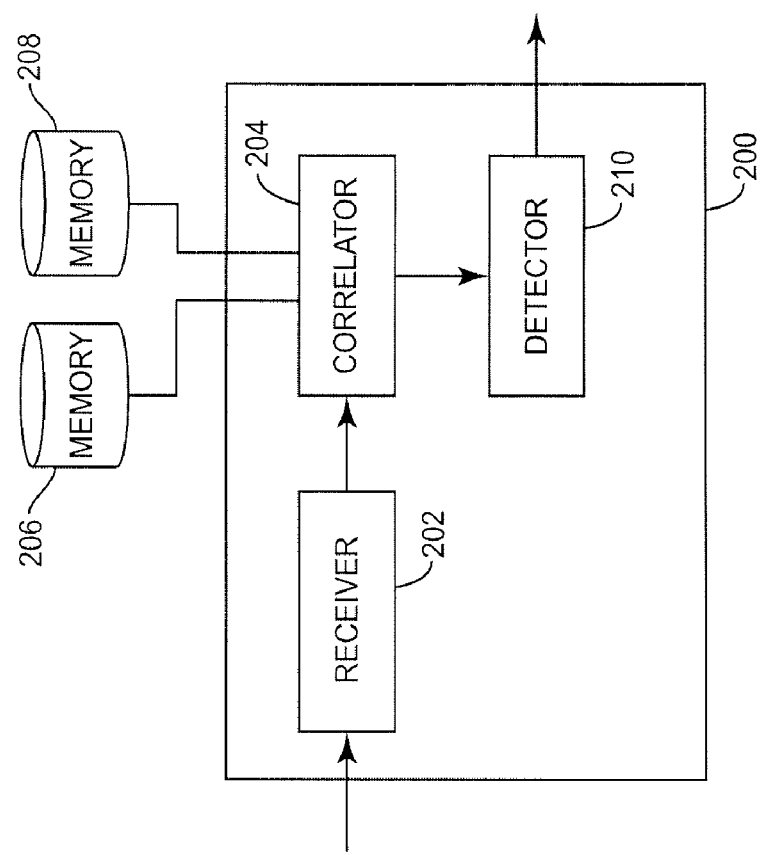
FIG. 2 is a functional block diagram schematically illustrating an embodiment of a detector for detecting access bursts in a RACH.

FIG. 2 schematically illustrates functional building blocks of an embodiment of a detector 200, which is adapted for detecting one or more access bursts in a random access channel. The detector 200 may be an implementation of the detector 118 or 120 of FIG. 1.

The detector 200 comprises a reception component 202, which is adapted to receive, in the random access channel, the one or more access bursts each including its transmission preamble. Each access burst may include a transmission preamble, which is a member of a preamble set including sequences of preamble symbols that can be obtained by cyclically shifting a base preamble sequence. The receiver 202 may receive a complete signal as it is received at an antenna of a base station including a range of frequencies and channels, or may receive a filtered signal which includes a RACH only. Additionally or alternatively, the receiver 202 may comprise its own filter, for example a bandpass-filter for filtering the frequency range of the random access channel from the received signal.

The detector 200 may further comprise a correlation component 204, which is adapted to determine correlation information indicative of a correlation of a single correlation preamble with each of the one or more received transmission preambles, wherein the correlation preamble is any member of the preamble set. Triggered by the random access signal forwarded from the component 202, the correlation component 204 may access a storage 206, wherein the correlation preamble is stored. The storage 206 may be external or internal to the detector 200. An external storage 206 may belong to a base station within which the detector 200 is implemented. The storage 206 may store multiple correlation preambles, one for each preamble set which may be utilized. Which one of the correlation preambles to utilize may be indicated to the correlation component 204, e.g., by a control component of the base station (not shown).

The correlation component 204 may be adapted to treat the correlation preamble and the one or more transmission preambles included in the received random access channel signal as periodic signals. For instance, the correlation component may cyclically correlate the signals. The cyclic correlation may be performed in a frequency-domain. The resulting correlation information includes an indication of a correlation of the correlation preamble with one or more transmission preambles (if any) included in the received random access channel signal.

Fast Fourier Transform (FFT) techniques may be used for the correlation procedure. For example, the correlation component 204 may access precompiled FFT- and inverse FFT-procedures, which are stored in a storage component 208 preferably in a precompiled format, for transforming the received signal and inverse transforming the correlation result. The conjugate complex correlation preamble may be stored in the storage component 206 already in a Fourier transformed representation. The correlation of the Fourier transformed received signal with the correlation preamble then requires only some multiplication and addition operations.

The detector 200 further comprises a detection component 210, which is adapted to detect, based on the correlation information, the one or more access bursts (if any) included in the received radio signal. To this end the detection component 210 analyses the correlation information forwarded from the correlation component 204. The detection component 210 may, e.g., determine correlation peaks in the correlation function, and may analyse these peaks to determine occurrence of one or more access bursts in the received signal. The detection component 210 may provide its detection result(s) to other components of the detector and/or the base station. For example, the detector 200 may perform further operations on the received signal such as analysing the detected access burst(s) for an identification of the originating mobile device (s).

Figure 3:
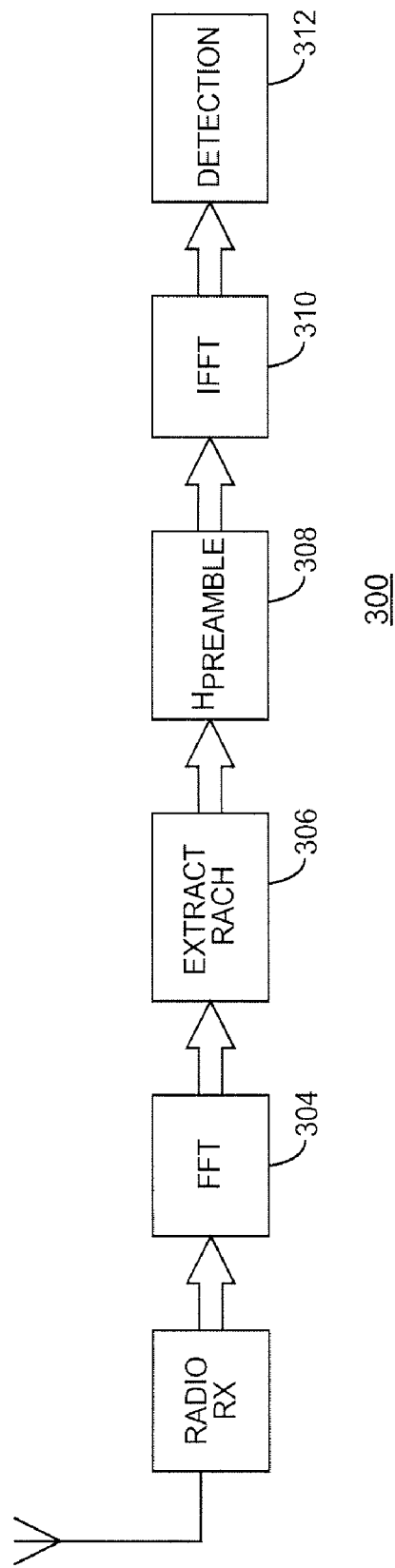
FIG. 3 is a functional block diagram schematically illustrating a further embodiment of a detector.

FIG. 3 illustrates a further embodiment of a detector 300, which may be an implementation of the detector 118 or 120 of FIG. 1. A received radio signal is provided to an FFT component 304, which transforms the received signal into the frequency domain by applying a Fourier transformation. In a component 306, a frequency range of a RACH is extracted from the frequency-transformed received signal. The resulting, transformed RACH signal is then multiplied with the frequency response $H_{preamble}$ (f) in the frequency domain at component 308. $H_{preamble}$ represents a conjugate complex Fourier transformed correlation preamble. This multiplication in the frequency domain corresponds to a cyclic correlation in the time domain.

The correlation result (i.e. the correlation information) is then transformed back into the time domain by an IFFT (inverse FFT) component 310. The output of the IFFT-component 310 is a periodic correlation function representing the RACH correlation signal cyclically convolved with the channel response. Finally, a detection component 312 detects preamble sequences in the received RACH signal by analysing the correlation information.

Thus, instead of applying a set of matched filters in the time domain to a received RACH signal and calculating an a-periodic correlation, the detector embodiments described with reference to FIGS. 2 and 3 calculate a periodic correlation.

Figure 4:
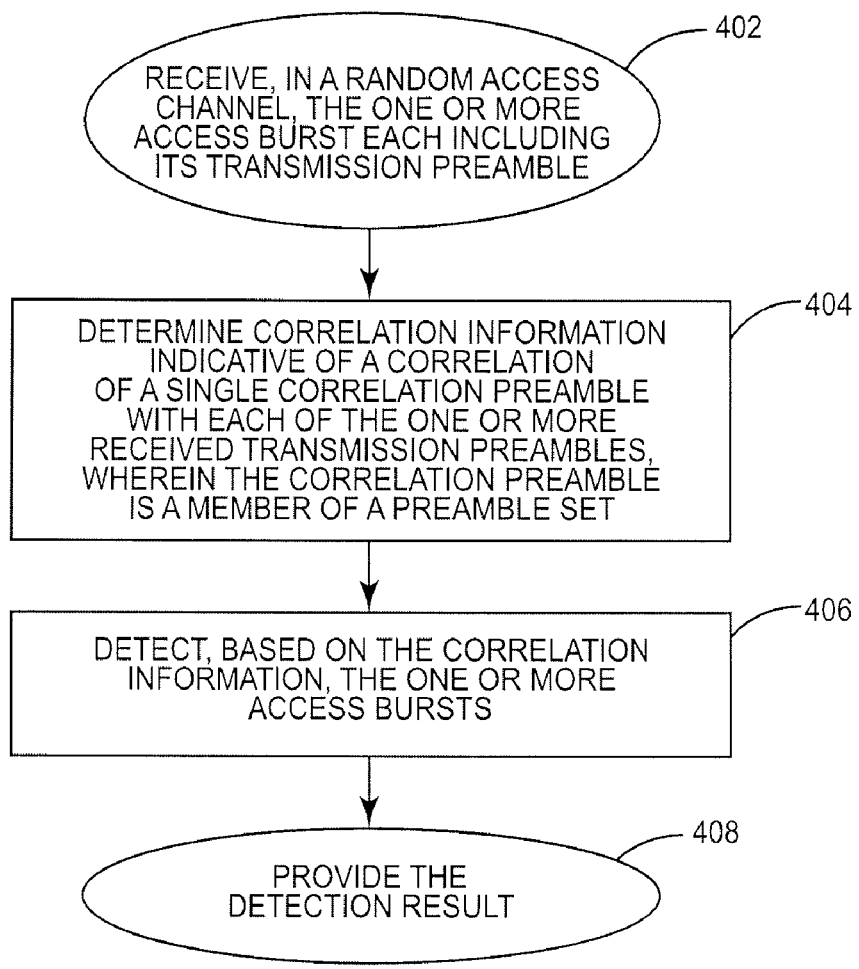
FIG. 4 is a flow diagram schematically illustrating steps of an embodiment of a method for detecting one or more access bursts in a random access channel.

FIG. 4 schematically illustrates an embodiment of a method 400 for detecting one or more access bursts in the random access channel. Each access burst includes a transmission preamble, wherein the transmission preamble is a member of a preamble set including sequences of preamble symbols that can be obtained by cyclically shifting a base preamble sequence.

In step 402, the method starts by receiving in the random access channel one or more access bursts, wherein each burst includes its transmission preamble. In step 404, correlation information is determined, which is indicative of a correlation of a single correlation preamble with each of the one or more received transmission preambles. The correlation preamble is any member of the preamble set. In step 406, the one or more access bursts are detected based on the correlation information determined in step 404. The method ends in step 408 with providing the detection results to other components of a detector or a radio base station.

Figure 5:
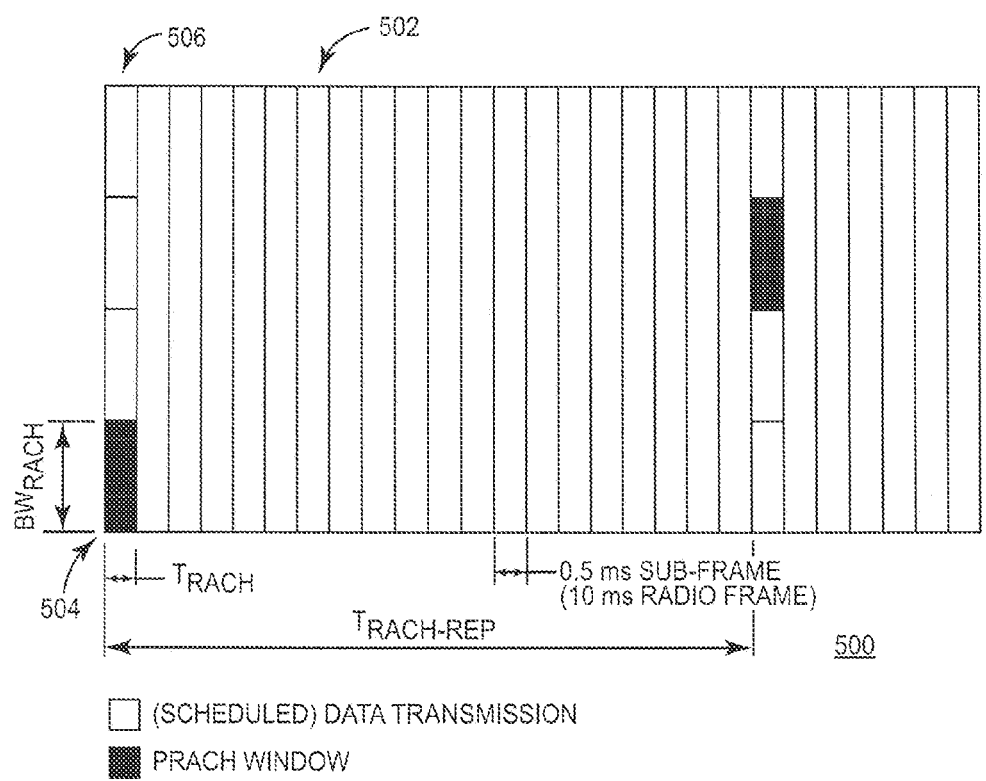
FIG. 5 is a schematic illustration of a time-frequency mapping of a RACH.

FIG. 5 is a schematic illustration of an embodiment of a time-frequency mapping 500 of a physical random access channel (PRACH). Time and frequency respectively extend horizontally and vertically. Time slots 502 each have a duration $T_{RACH}$=0.5 ms (milliseconds). A radio transmission frame of duration 10 ms thus comprises time slots (subframes) 0-19. In another embodiment, time slots may have a duration $T_{RACH}$=1.0 ms each. A radio transmission frame of duration 10 ms would then comprise time slots 0-9. The timeslot duration $T_{RACH}$ may be extended for large cells. The PRACH 504 is assigned the time slot 0 (reference numeral 506) in each transmission frame. Any other timeslot may be assigned as well.

The PRACH may occupy the entire bandwidth BW available over the radio interface, to which the scheme illustrated in FIG. 5 is applied. However, in the embodiment 500, the bandwidth $BW_{RACH}$ assigned to the RACH is only a fraction of the available bandwidth. Frequency hopping is applied to the PRACH, such that a different frequency range is assigned to the PRACH in subsequent transmission frames. The RACH is orthogonal to data transmissions in other channels, e.g. traffic channels.

The transmission scheme illustrated in FIG. 5 may be announced to mobile devices by the base station, e.g., by transmitting related information in a broadcast channel into the cell served by the base station.

Figure 6:
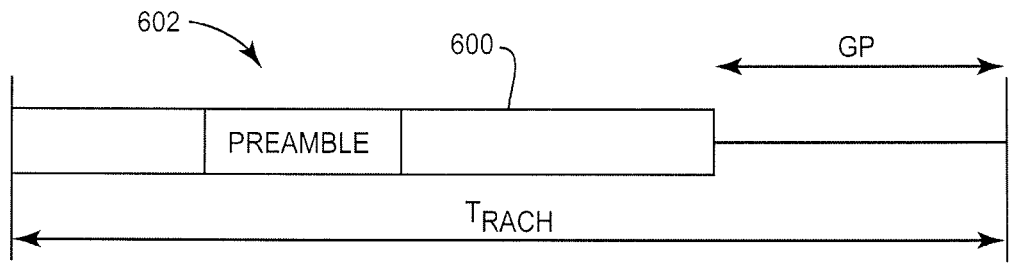
FIG. 6 is a schematic illustration of an access burst format.

FIG. 6 illustrates the structure of an access burst 600 which may be transmitted by a mobile device in the RACH illustrated in FIG. 5. The access burst 600 comprises a preamble sequence 602. Further sections of the access burst (not shown) may represent data related to an identification of the originating mobile device, the type of connection requested by the mobile device, etc.

As the mobile device transmitting the access burst 600 is not time synchronized in the uplink, the burst arrives at the base station with an unknown propagation delay. Therefore, a guard period (GP) of length $T_{GP}$ is required to avoid overlapping of the access burst with other bursts in subsequent time slots. As an example, the guard period GP may have a duration $T_{GP}$=100 μs (microseconds), such that the access burst may have a length of 400 μs. In an alternative embodiment, wherein $T_{RACH}$=1.0 ms, the access burst may have a length of 900 μs. A guard period GP with $T_{GP}$=100 μs leads to a maximum allowed cell radius of order 15 kilometers. The preamble (having a length of, e.g., 800 μs) can be received at the base station with a maximum delay of 100 μs.

A cyclic prefix may also be included in the access burst in conjunction with the preamble 602. For example, the preamble 602 may be a sequence of symbols S0- . . . -S7, then a cyclic prefix may comprise symbols S5, S6, S7 which are copied from the end of the preamble and may be appended to the front of the preamble. Alternatively, the preamble 602 may not have a cyclic prefix appended, but the base station may copy a portion of the received signal which potentially contains a preamble sequence and may add the copied portion to the front of the preamble. In this way, the preamble may be periodically extended.

Figure 7:
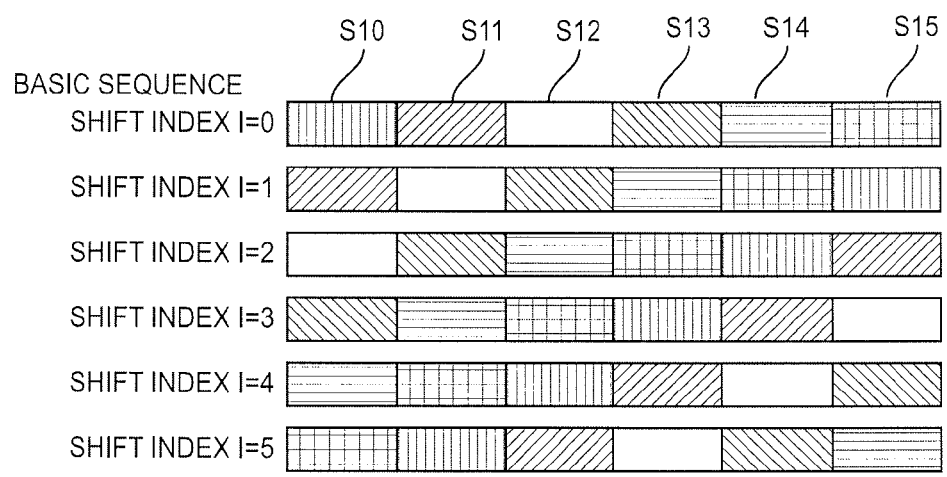
FIG. 7 is a schematic illustration of a preamble set with cyclically shifted preamble sequences.

FIG. 7 schematically illustrates a preamble set 700 based on six different segments S10-S15. Each of the segments consists of a number of symbols; for example, a segment may comprise 1 symbol, 10 symbols, or any other number of symbols. The number of symbols per segment may be larger than 10 symbols. In one embodiment, for example, each of the segments may comprise 300 symbols. Assuming that each of the segments contains one symbol, each of the reference numerals S10-S15 indicates one symbol.

The sequence length of the preambles of set 700 is 6 times the length of a single segment. Therefore, in total 6 different preambles can be formed, where all of the sequences are mutually cyclic shifted. Such a small number of preambles may be sufficient in order to enable multiple devices to simultaneously perform a random access procedure in a cell. A mobile device may randomly select one of the sequences from the preamble set or may use a fixed transmission preamble, which may have been pre-installed, for example. In some embodiments, instead of only one set of preambles multiple preamble sets may be provided for use by the mobile device. The device may then choose one of the preamble sets and a particular one of the preambles from the chosen preamble set as the transmission preamble.

The set of preambles 700 illustrated in FIG. 7 might be constructed by (arbitrarily) defining a basic sequence, which is associated with the shift index I=0 in FIG. 7. The basic sequence may be chosen such that it possesses good or even essentially ideal periodic auto-correlation properties. In general, the preambles of a preamble set need to have periodic (auto-)correlation properties which allow a detection of correlation peaks with at least a desired confidence.

The further preambles of the preamble set may then be constructed by cyclically shifting the symbols forming the basic preamble sequence. The preamble sequence with shift index I=1 is constructed by cyclically shifting the symbols of the basic preamble sequence clockwise, wherein the shift amounts to one segment (in this embodiment). The further preamble sequences are constructed similarly. Therefore, assuming that a segment comprises one symbol, the cyclic shift amounts to one symbol. In an embodiment with the segments comprising ten symbols each, the shift amounts to ten symbols.

In general, a minimum cyclic shift might be defined which is equal to or larger than a (cyclic) shift amount corresponding to the maximum allowed propagation delay in a cell plus the delay spread of the channel. The minimum shift might amount to one, two or more symbols to be shifted from one sequence to the next in the preamble set. The preamble sequences may be constructed by cyclically shifting integer multiples of this minimum shift, starting from the basic preamble sequence. This ensures that ambiguities in the preamble detection due to propagation round trip time and channel spread can be avoided, as will become clear below.

FIG. 8 illustrates the periodic cross-correlation function (CCF) in terms of "correlation power" vs. time between preamble sequences of a preamble set and the basic preamble sequence in an ideal case, in which the preamble sequences have ideal periodic auto-correlation properties (i.e. the auto-correlation is a Dirac function in the origin). Further, any channel impact is neglected.

The periodic CCF between cyclic shifted preamble sequences with, for example, shift index I=0, 1, 5 and the basic preamble sequence may lead to correlation functions as indicated in FIG. 8. In particular, the correlation function for the shift index I=0 is the auto-correlation function of the basic preamble sequence. A cross correlation of different preamble sequences of the same preamble set with the basic preamble sequence in the correlation power-time diagram appears shifted in the time dimension, wherein the time shift is related to the shift index I. This can be understood by considering the preamble sequences of different index I periodically extended in the time dimension. A sequence with a particular index can then be matched to the basic preamble sequence by shifting it by integer multiples of the shift amount. The shifting corresponds to a time delay as indicated by the correlation functions 802 and 804 in FIG. 8.

Figure 9:
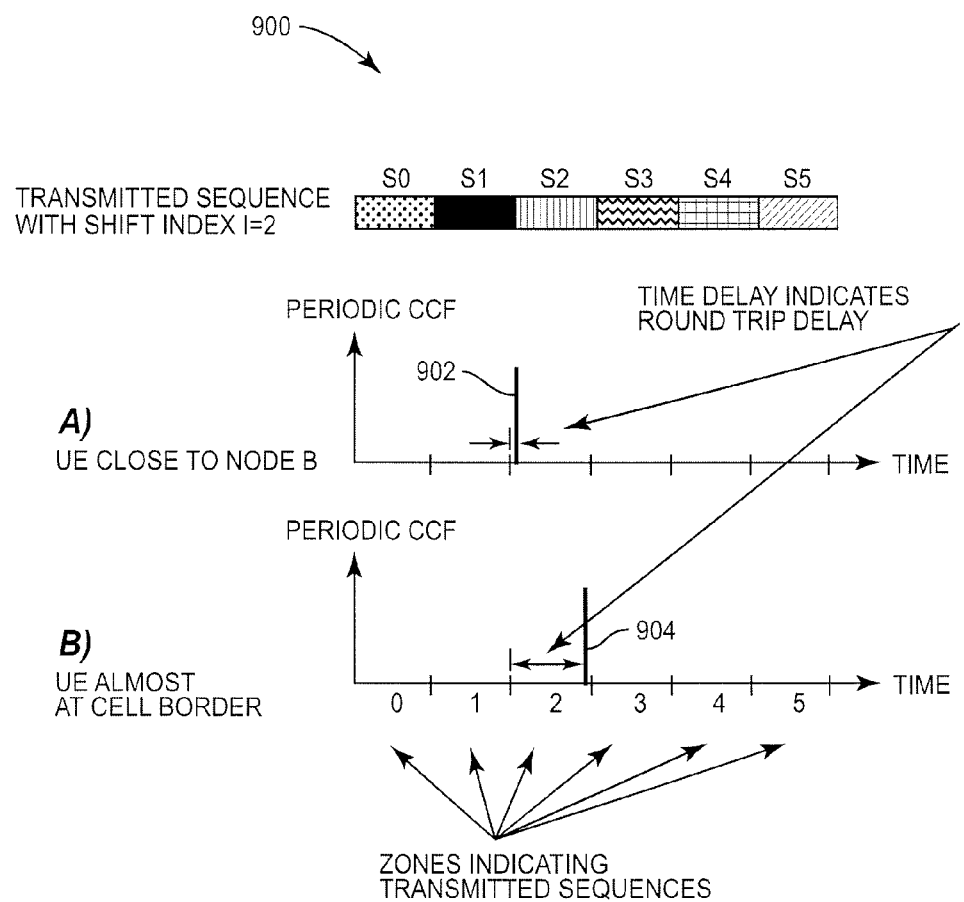
FIG. 9 is a schematic illustration of a shift of a correlation peak due to propagation round trip time delay.

FIG. 9 schematically illustrates an embodiment of a preamble sequence 900 comprising segments S0-S5, each segment containing one or more symbols. It is assumed that the transmission preamble 900 is correlated in a detector such as that of FIGS. 2, 3 with a correlation preamble which is the basic preamble of the set including preamble 900. The cyclic shift between the transmission preamble and the correlation preamble is 2 times a minimum shift, i.e. shift index I=2. Further, influences of delay spread in the channel are neglected and it is assumed that the preamble 900 (or any preamble of the underlying preamble set) comprises ideal periodic autocorrelation properties as illustrated in FIG. 8.

Two cases a) and b) are illustrated in FIG. 9. In case a) it is assumed that the mobile device transmitting the preamble 900 is located near to the base station wherein the detector is located. Then the round trip delay is small and the correlation peak 902 is located within the I=2 zone near to its inner border. In contrast, in case b), it is assumed that the user equipment is located near to the cell border. Consequently the round trip delay is large and the correlation peak 904 is located near the opposite zone border.

The calculated correlation will have its maximum correlation peak at a time instance corresponding to the amount of cyclic shift plus the propagation round trip time between mobile device and base station. This is the reason why it is preferable that preamble sequences of a preamble set may be shifted against each other by at least a minimum shift, which amounts to at least the maximum propagation round trip time in the cell plus channel spread. Otherwise, ambiguities may occur in case transmission preambles with different shift indices and different round trip time delays interfere.

The position of the correlation peaks inside the zones may thus be used to determine the round trip time. This can be done by measuring the time delay between the inner border of the zone, in which the correlation peak is located, and the position of the correlation peak. Furthermore, as the correlation peaks of preambles with different shift indices are located in different zones of the periodic CCF, multiple transmission preambles of a preamble set lead to multiple correlation peaks of the correlation function. Thus a simultaneous detection of multiple preambles with different cyclic shifts can be performed. In other words, a single detector utilizing a single correlation preamble is sufficient for the detection of multiple access bursts.

The techniques proposed herein thus allow detecting multiple transmission preambles simultaneously with a single detector. As the detection is based on a single correlation preamble only, the detector may have a comparably simple structure. Furthermore, calculating correlation information for detecting the access burst(s) may be done by using FFT techniques which allow a fast and resource-efficient calculation.

The proposed techniques also allows, following the detection of the preamble of an access burst, to determine the propagation round trip time in a simple manner. The proposed techniques further allow to arrange two or more detectors in a radio base station, wherein each detector utilizes different preamble sets. In this way, the number of available transmission preambles can easily be increased.

While the current invention has been described in relation to its preferred embodiments, it is to be understood that this disclosure is for illustrative purposes only. Accordingly, it is intended that the invention be limited only by the scope of the claims appended hereto.

The invention claimed is:

1. A method for detecting multiple access bursts in a random access channel, each access burst including a transmission preamble that is a member of a preamble set, and wherein the preamble set includes sequences of preamble symbols obtained by cyclically shifting a basic preamble sequence, the method comprising the steps of:
   receiving multiple access bursts in the random access channel including as transmission preambles different members of the preamble set;
   determining correlation information comprising a correlation function indicating a correlation between a single correlation preamble and each of the received multiple different transmission preambles in a time dimension, wherein the correlation preamble is a member of the preamble set, and wherein determining the correlation information further comprises subdividing the correlation function into zones, each zone being associated with the correlation of one member of the preamble set with the correlation preamble; and
   substantially simultaneously detecting the multiple access bursts by analyzing the correlation information determined using the single correlation preamble.

2. The method of claim 1 wherein determining the correlation information comprises treating the correlation preamble and the multiple transmission preambles as periodic signals.

3. The method of claim 2 wherein determining the correlation information further comprises cyclically correlating the correlation preamble and the multiple transmission preambles.

4. The method of claim 3 wherein cyclically correlating the correlation preamble and the multiple transmission preambles is performed in a frequency domain.

5. The method of claim 3 wherein cyclically correlating the correlation preamble and the multiple transmission preambles is performed using Fourier Transform techniques.

6. The method of claim 5 further comprising:
   performing a Fourier Transform of a received signal; and
   extracting a frequency band corresponding to the random access channel.

7. The method of claim 1 further comprising determining, based on the correlation information, a propagation round trip time for at least one of the multiple received transmission preambles.

8. The method of claim 1 wherein the sequences of the preamble set are cyclically shifted versions of each other, and are shifted by at least a minimum shift corresponding to a predetermined maximum time delay for the transmission preambles depending on channel propagation properties.

9. The method of claim 1 wherein each preamble symbol utilized for the preamble sequences is utilized only once per preamble sequence.

10. The method of claim 1 wherein determining the correlation information further comprises:
    determining a correlation peak in the correlation function corresponding to one of the multiple transmission preambles;
    determining the zone within which the correlation peak is located; and
    detecting one of the multiple received access bursts based on the determined zone.

11. The method of claim 10 further comprising:
    determining a peak shift of the correlation peak relative to a border of the zone within which the correlation peak is located; and
    calculating, based on the peak shift, the propagation round trip time.

12. A non-transitory computer readable medium comprising program code portions stored thereon, the code configured to control a computing device to detect multiple access bursts in a random access channel, each access burst including a transmission preamble that is a member of a preamble set, wherein the preamble set includes sequences of preamble symbols obtained by cyclically shifting a basic preamble sequence, the code configured to further control the computing device to:
   receive multiple access bursts in the random access channel including as transmission preambles different members of the preamble set;
   determine correlation information comprising a correlation function indicating a correlation between a single correlation preamble and each of the received multiple different transmission preambles in a time dimension, wherein the correlation preamble is a member of the preamble set, and wherein the code is further configured to determine the correlation information by subdividing the correlation function into zones, each zone being associated with the correlation of one member of the preamble set with the correlation preamble; and substantially simultaneously detect the multiple access bursts by analyzing the correlation information determined using the single correlation preamble.

13. A detector for detecting multiple access bursts in a random access channel, wherein each access burst includes a transmission preamble, the transmission preamble being a member of a preamble set including sequences of preamble symbols obtained by cyclically shifting a basic preamble sequence, the detector comprising:
- a reception component configured to receive multiple access bursts in the random access channel including as transmission preambles different members of the preamble set;
- a correlation component configured to determine correlation information comprising a correlation function indicating a correlation between a single correlation preamble and each of the received multiple different transmission preambles in a time dimension, wherein the correlation preamble is a member of the preamble set, and wherein the correlation component is further configured to determine the correlation information by subdividing the correlation function into zones, each zone being associated with the correlation of one member of the preamble set with the correlation preamble; and
- a detection component configured to substantially simultaneously detect multiple access bursts by analyzing the correlation information determined using the single correlation preamble.

14. The detector of claim 13 wherein the correlation component is configured to treat the correlation preamble and the multiple transmission preambles as periodic signals.

15. A radio base station for performing a random access procedure, the radio base station comprising:
- a detector configured to substantially simultaneously detect multiple access bursts in a random access channel, each access burst including a transmission preamble that is a member of a preamble set including sequences of preamble symbols obtained by cyclically shifting a basic preamble sequence, the detector comprising:
  - a reception component configured to receive, in the random access channel, multiple access bursts including as transmission preambles different members of the preamble set;
  - a correlation component configured to determine correlation information comprising a correlation function indicating a correlation between a single correlation preamble and each of the received multiple different transmission preambles in a time dimension, wherein the correlation preamble is a member of the preamble set, and wherein the correlation component is further configured to determine the correlation information by subdividing the correlation function into zones, each zone being associated with the correlation of one member of the preamble set with the correlation preamble; and
  - a detection component configured to substantially simultaneously detect multiple access bursts by analyzing the correlation information determined using the single correlation preamble.

16. The radio base station of claim 15 further comprising two or more detectors, each detector being configured for a different preamble set.

* * * * *